US011024140B2

(12) United States Patent
Paliwal et al.

(10) Patent No.: US 11,024,140 B2
(45) Date of Patent: Jun. 1, 2021

(54) AIR MONITORING DEVICE INCLUDING A HOUSING WITH COMMUNICATION PORT ACCESS

(71) Applicant: CARRIER CORPORATION, Palm Beach Gardens, FL (US)

(72) Inventors: Anand Paliwal, Colorado Springs, CO (US); Rick L. Mantz, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/846,790

(22) Filed: Apr. 13, 2020

(65) Prior Publication Data

US 2020/0357254 A1 Nov. 12, 2020

Related U.S. Application Data

(60) Provisional application No. 62/843,671, filed on May 6, 2019.

(51) Int. Cl.
*G08B 17/10* (2006.01)
*G05B 11/01* (2006.01)
*G08B 29/18* (2006.01)

(52) U.S. Cl.
CPC .............. *G08B 17/10* (2013.01); *G05B 11/01* (2013.01); *G08B 29/18* (2013.01)

(58) Field of Classification Search
CPC ......... G08B 17/10; G08B 29/18; G05B 11/01
See application file for complete search history.

(56) References Cited

U.S. PATENT DOCUMENTS

| 3,900,795 | A | | 8/1975 | Larsen et al. |
| 4,845,474 | A | | 7/1989 | Moore et al. |
| 5,574,625 | A | * | 11/1996 | Ohgami ................ G06F 1/1626 312/223.2 |
| 7,425,151 | B2 | | 9/2008 | Baba et al. |

(Continued)

FOREIGN PATENT DOCUMENTS

| CN | 204178528 U | 2/2015 |
| CN | 205177064 U | 4/2016 |

(Continued)

OTHER PUBLICATIONS

How to Test and Repair a Smoke Detector Circuit, Apr. 1, 2019, 6 pages https://ask-the-electrician.com/how-to-test-and-repair-a-smoke-detector-circuit/.

*Primary Examiner* — Mohamed Barakat
(74) *Attorney, Agent, or Firm* — Carlson, Gaskey & Olds

(57) ABSTRACT

An illustrative example monitoring device includes a housing, a detector portion situated in the housing, a substrate situated in the housing and memory supported on the substrate. The memory is configured to contain information regarding operation of the detector portion. The substrate or the memory includes a communication port situated adjacent a portion of the housing. The communication port facilitates obtaining information from the memory. The portion of the housing includes at least one movable section that covers the communication port when the at least one moveable section is in a first position relative to the housing and exposes the communication port when the at least one moveable section is in a second position relative to the housing.

20 Claims, 4 Drawing Sheets

(56) References Cited

U.S. PATENT DOCUMENTS

| | | | |
|---|---|---|---|
| 7,880,605 B2 * | 2/2011 | Leyden | G08B 25/008 |
| | | | 340/506 |
| 8,266,974 B2 | 9/2012 | Hall et al. | |
| 8,749,259 B2 | 6/2014 | Gulzow et al. | |
| 10,600,300 B2 * | 3/2020 | Williamson | G08B 17/10 |
| 2005/0231352 A1 * | 10/2005 | DiPoala | G08B 29/18 |
| | | | 340/521 |
| 2011/0005798 A1 * | 1/2011 | Moskowitz | H01M 50/20 |
| | | | 174/50 |
| 2012/0171987 A1 * | 7/2012 | Newman | G08B 29/181 |
| | | | 455/404.1 |
| 2013/0201024 A1 | 8/2013 | Greenwood et al. | |
| 2015/0030375 A1 * | 1/2015 | Kawaguchi | G01N 21/53 |
| | | | 403/19 |
| 2018/0004171 A1 * | 1/2018 | Patel | F24F 5/0017 |
| 2018/0149581 A1 | 5/2018 | Lo | |

FOREIGN PATENT DOCUMENTS

| | | |
|---|---|---|
| CN | 207200733 U | 4/2018 |
| JP | 2678090 B2 | 11/1997 |
| JP | 2001216578 A | 8/2001 |
| JP | 2008065404 A | 3/2008 |

* cited by examiner

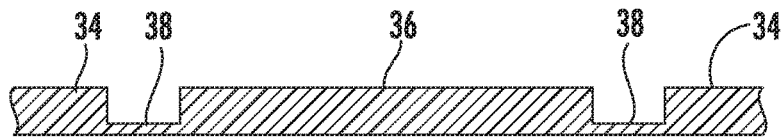
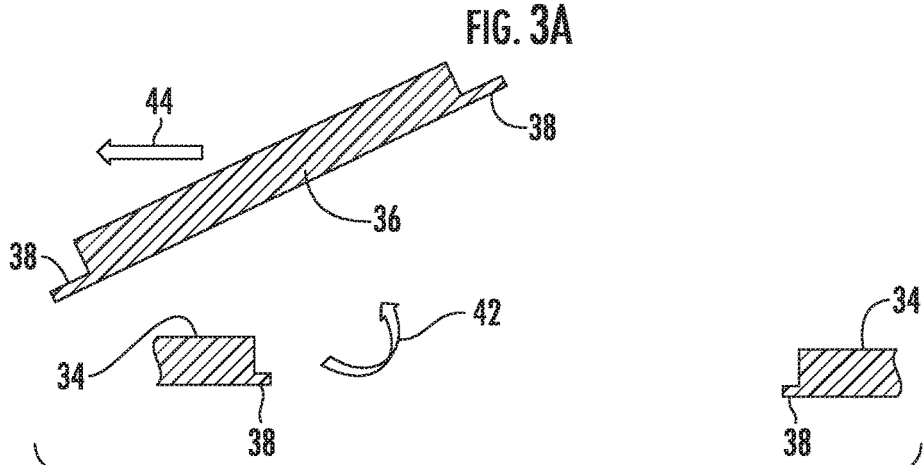
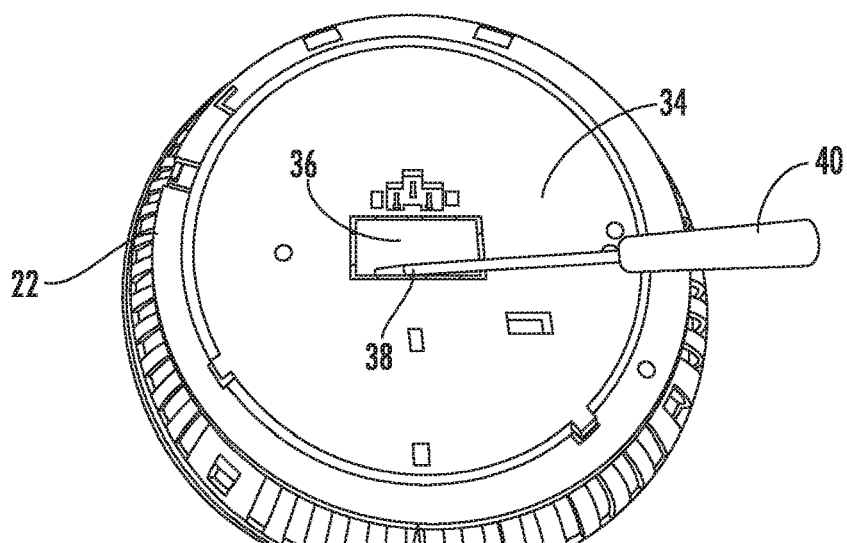
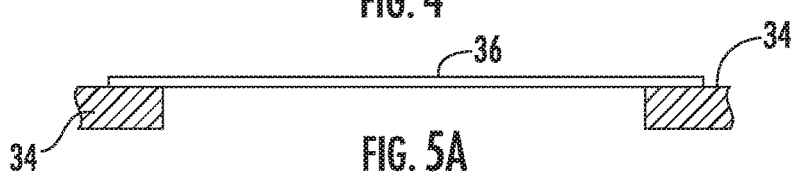
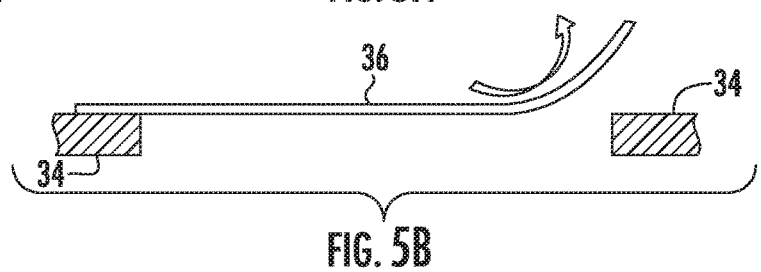

AIR MONITORING DEVICE INCLUDING A HOUSING WITH COMMUNICATION PORT ACCESS

CROSS-REFERENCE TO RELATED APPLICATION

This application claims priority to U.S. Provisional Application No. 62/843,671, which was filed on May 6, 2019.

BACKGROUND

Various air quality monitoring devices are known. Smoke detectors are widely used to monitor the air in an enclosed space or building to provide a warning or alarm when smoke is present. Other detectors are designed to detect carbon monoxide, contaminants, or pathogens that affect air quality and the health of individuals exposed to them.

There are situations in which it is desirable to obtain information from a controller or electronics of the monitoring device. One challenge presented by many monitoring device configurations is that gaining access to the controller or electronics to obtain such information requires disturbing the condition of at least some portions of the device in a way that interferes with or defeats attempts at further testing or information gathering.

SUMMARY

An illustrative example monitoring device includes a housing, a detector portion situated in the housing, a substrate situated in the housing and memory supported on the substrate. The memory is configured to contain information regarding operation of the detector portion. The substrate or the memory includes a communication port situated adjacent a portion of the housing. The communication port facilitates obtaining information from the memory. The portion of the housing includes at least one movable section that covers the communication port when the at least one moveable section is in a first position relative to the housing and exposes the communication port when the at least one moveable section is in a second position relative to the housing.

An example embodiment having one or more features of the monitoring device of the previous paragraph includes a controller situated in the housing, the memory being associated with the controller, the communication port facilitating communication with the controller.

In an example embodiment having one or more features of the monitoring device of any of the previous paragraphs, communication with the controller comprises at least one of obtaining information from the controller and providing programming to the controller.

In an example embodiment having one or more features of the monitoring device of any of the previous paragraphs, the at least one moveable section is moveable from the first position toward the second position by breaking the at least one moveable section away from the portion of the housing.

In an example embodiment having one or more features of the monitoring device of any of the previous paragraphs, the portion of the housing comprises a wall, the wall includes a breakable segment, the wall has a first thickness, the breakable segment has a second thickness that is less than the first thickness, and the breakable segment breaks as the at least one moveable section moves from the first position toward the second position.

In an example embodiment having one or more features of the monitoring device of any of the previous paragraphs, the at least one moveable section comprises an adhesive sheet.

In an example embodiment having one or more features of the monitoring device of any of the previous paragraphs, the at least one moveable section is pivotally moveable from the first position toward the second position.

In an example embodiment having one or more features of the monitoring device of any of the previous paragraphs, the portion of the housing comprises a wall, the portion of the housing includes a living hinge between the wall and the at least one moveable section along one side of the at least one moveable section, and the wall releasably engages the at least one moveable section along an opposite side of the at least one moveable section.

In an example embodiment having one or more features of the monitoring device of any of the previous paragraphs, the portion of the housing comprises a first material, the at least one moveable section comprises a second material, and the second material is different than the first material.

In an example embodiment having one or more features of the monitoring device of any of the previous paragraphs, the first material comprises a rigid plastic and the second material comprises an adhesive sheet received against the rigid plastic.

In an example embodiment having one or more features of the monitoring device of any of the previous paragraphs, the substrate comprises a printed circuit board, the communication port comprises a plurality of conductors on the printed circuit board, at least one portion of each of the conductors is exposed on one side of the printed circuit board, and the one side of the printed circuit board faces toward the portion of the housing.

In an example embodiment having one or more features of the monitoring device of any of the previous paragraphs, at least one of the substrate and the housing is configured to receive a portion of a communication device for holding the communication device in a position to contact the communication port.

In an example embodiment having one or more features of the monitoring device of any of the previous paragraphs, the substrate includes a plurality of holes configured to receive corresponding protrusions on the communication device.

In an example embodiment having one or more features of the monitoring device of any of the previous paragraphs, the portion of the housing includes an opening when the at least one moveable section is in the second position and an edge of the opening is configured to cooperate with a portion of the communication device to hold the communication device adjacent the communication port.

In an example embodiment having one or more features of the monitoring device of any of the previous paragraphs, the portion of the housing is on a side of the housing that is configured to be situated against a structure when the mounting device is installed in a monitoring location.

In an example embodiment having one or more features of the monitoring device of any of the previous paragraphs, the detector portion is configured to detect smoke.

An illustrative example embodiment of a communication device configured to communicate with the monitoring device of any of the previous paragraphs includes at least one conductor; at least one pin near one end of the at least one conductor, the at least one pin being configured to contact the communication port; and at least one positioning member near the at least one pin, the at least one positioning member interfacing with at least one of the housing and the substrate to position the at least one pin to contact the communication port.

An example embodiment having one or more features of the communication device of the previous paragraph includes a connector housing near the one end of the conductor and a biasing member supported by the connector housing. The biasing member resiliently biases the at least one pin in a direction away from the one end of the conductor.

In an example embodiment having one or more features of the communication device of any of the previous paragraphs, the at least one positioning member comprises at least one post near the at least one pin, the at least one post being configured to be received in a recess in at least one of the substrate and the housing.

In an example embodiment having one or more features of the communication device of any of the previous paragraphs, the at least one positioning member comprises a detent on the connector housing and the detent is configured to engage the portion of the housing when the at least one moveable section is in the second position.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 3A is a cross-sectional illustration taken along the lines A-A in FIG. 2 with a moveable section of a housing of the monitoring device in a first position.

FIG. 3B shows the embodiment of FIG. 3A with the moveable section of the housing in a second position.

FIG. 4 diagrammatically illustrates an example technique of removing the example moveable section of FIG. 2.

FIG. 5A is a cross-sectional illustration similar to FIG. 3A but showing another example embodiment with a moveable section in a first position.

FIG. 5B schematically shows movement of the moveable section of the embodiment of FIG. 5A.

DETAILED DESCRIPTION

There are situations in which it is desirable to obtain information from a controller or electronics of a monitoring device. One challenge presented by many monitoring device configurations is that gaining access to the controller or electronics to obtain such information requires disturbing the condition of at least some portions of the device in a way that interferes with or defeats attempts at further testing or information gathering. As a non-limiting example, when investigating the level of internal dust contamination reported by a device in operation, removing the device housing in order to access the controller may change the amount of dust within the device (by allowing dust to enter or to escape monitored portions of the device), which in turn may alter the dust contamination value reported by the device. Thus, it would be desirable to obtain information from a controller or other electronics of the monitoring device without removing the housing.

Figure 1:
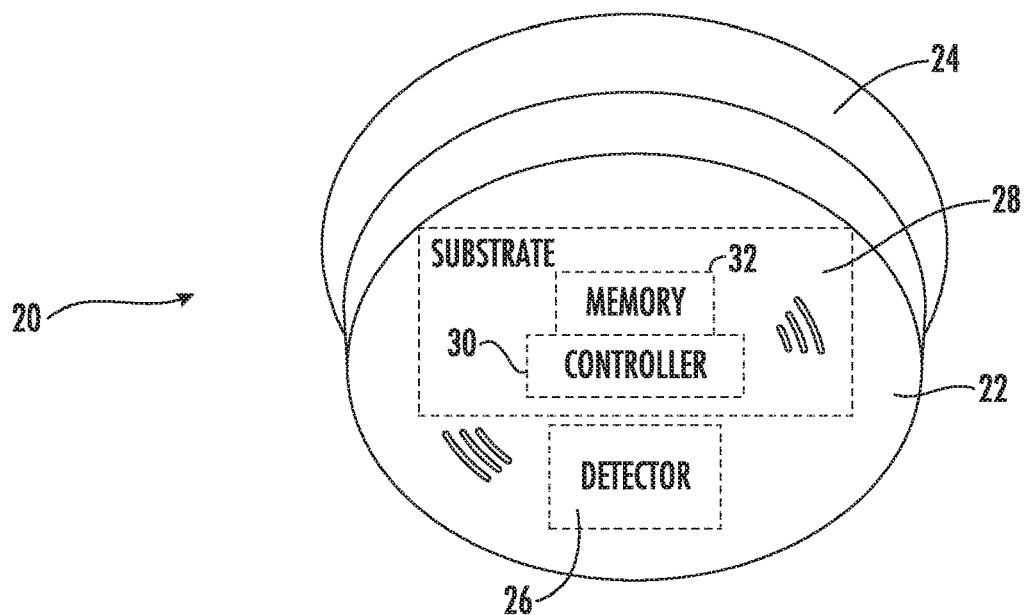
FIG. 1 schematically illustrates a monitoring device designed according to an example embodiment.

FIG. 1 shows an example monitoring device 20 that is useful for monitoring the quality or contents of air. The monitoring device 20 includes a housing 22 and a mounting plate 24 that is configured to be secured to a structure, such as a ceiling or wall inside a building or room.

A detector portion 26 is situated in the housing 22. The detector portion is configured to detect a contaminant or substance in the vicinity of the monitoring device 20 in a manner consistent with commercially available detectors, such as smoke detectors. In some embodiments the detector portion 26 is configured to monitor or detect smoke. Other example embodiments include the capability to monitor or detect at least one of carbon monoxide, airborne pathogens, and other contaminants. For discussion purposes, the illustrated monitoring device 20 will be considered a smoke detector.

The monitoring device 20 includes a substrate 28 situated within the housing 22. The substrate 28 in some embodiments comprises a printed circuit board. A controller 30 and memory 32 that is associated with the controller 30 are supported on the substrate 28 and situated within the housing 22. The controller 30 includes at least one computing device, such as a microprocessor, and operates in a manner consistent with controllers in commercially available monitoring devices, such as smoke detectors. The memory 32 is configured to contain information, such as information pertaining to or describing performance or operation of the detector portion 26 and the controller 30. Although the controller 30 and memory 32 are schematically shown as distinct for discussion purposes, the memory 32 may be a portion of the controller 30 in some embodiments and they are not necessarily distinct components.

Figure 2:
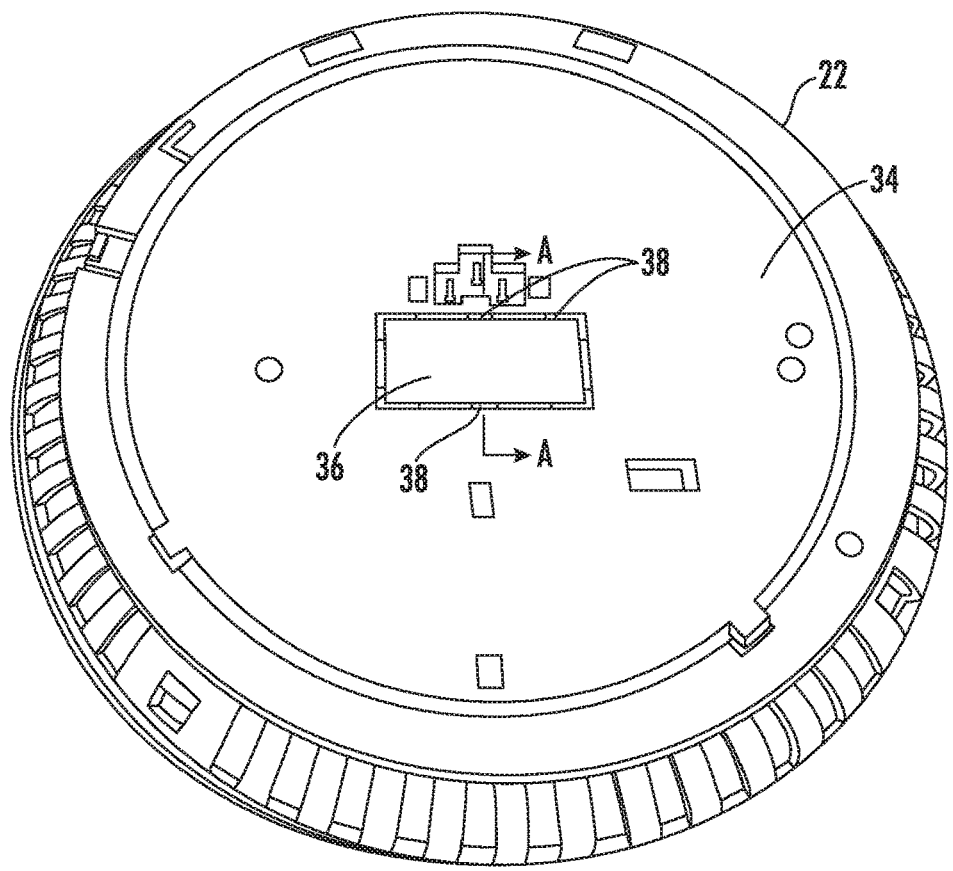
FIG. 2 diagrammatically illustrates selected features of the monitoring device shown in FIG. 1.

As shown in FIG. 2, the housing 22 includes a portion 34 that is received against the mounting plate 24 and faces the structure, such as a ceiling, when the monitoring device 20 is installed in a location where smoke detection is desired. The portion 34 comprises a wall of the housing in this example. The portion 34 includes at least one moveable section 36 that is shown in a first position relative to the portion 34 in FIG. 2.

The first position of the moveable section 36 corresponds to a condition of the housing 22 and the monitoring device 20 that is suitable or appropriate to be installed and used as smoke detector during regular operation, that is, while the monitoring device 20 is monitoring for hazards or air quality. There are situations in which it is desirable to access at least one of the memory 32 and the controller 30 to obtain information regarding performance or operation of the monitoring device. For example, the detector portion 26 may not operate as expected and it would be useful to diagnose the condition of the detector portion by obtaining information regarding the performance or operation of the detector portion 26 from the memory 32.

The moveable section 36 can be moved from the first position shown in FIG. 2 to a second position relative to the portion 34. The embodiment of FIG. 2 includes a breakable segment 38 that can be selectively broken to separate the moveable section 36 from the portion 34. As can be appreciated from FIGS. 2 and 3A, the breakable segment 38 includes a reduced amount of material compared to the wall of the portion 34. In this example, the wall of the portion 34 has a first thickness and the breakable segment 38 has a second thickness that is less than the first thickness. The reduced thickness of the breakable segment 38 facilitates moving the moveable section 36 from the first position to the second position, which includes the moveable section 36 being separated from the rest of the housing in this example.

FIG. 4 illustrates an example technique of breaking the breakable segment 38 by manipulating the moveable section 36 with a tool 40, such as a screw driver. In the illustrated example, the housing 22 is made of a plastic material and manipulating the moveable section 36 as schematically shown by the arrow 42 in FIG. 3B breaks the breakable segment 38 and frees the moveable section 36 so it can be removed from the first position toward a second position as schematically shown by the arrow 44. In some embodiments, the moveable section 36 is disposed of once it is removed from the first position where it was part of the housing 22, that is, the moveable section 36 is discarded and not intended to be used for further analysis or operation of the monitoring device 20. For example, once the moveable section 36 is discarded the monitoring device 20 may not later resume operation for its original monitoring purpose although it may still be used for testing, development, or other analysis.

Another example embodiment is shown in FIGS. 5A and 5B. In this example, the moveable section 36 comprises a sheet of material that may be different than the material of the housing 22. In this example, at least the edges of the moveable section 36 are adhesively secured to the outer surface of the portion 34. In some such embodiments the moveable section 36 comprises a sticker that can also serve as a label containing printed information. When it desired or necessary to move the moveable section 36 from the first position shown in FIG. 5A the moveable section 36 can be peeled off and removed from the housing 22. FIG. 5B shows one side or edge of the moveable section 36 being lifted off or peeled from the housing portion 34. The moveable section 36 can be completely removed in that exemplary manner.

The exemplary embodiment of FIGS. 5A and 5B may also be combined with other the other disclosed exemplary embodiments For example, a sheet of material, such as a sticker, as shown in FIGS. 5A and 5B may be a moveable section 36 placed over another moveable section 36 attached to the housing 22 via a breakable segment 38 as illustrated in FIGS. 3A and 3B.

Figure 6A:
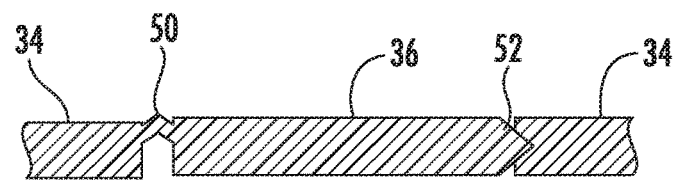
FIG. 6A is a cross-sectional illustration similar to FIG. 3A but showing another example embodiment with a moveable section in a first position.
Figure 6B:
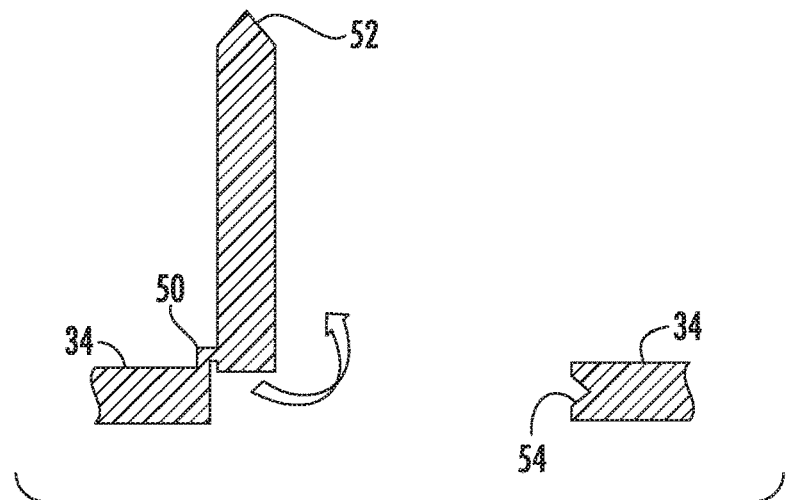
FIG. 6B shows the embodiment of FIG. 6A with the moveable section of the housing in a second position.

Another example embodiment is shown in FIGS. 6A and 6B. In this example, the moveable section 36 is pivotally moveable from the first position shown in FIG. 6A to the second position shown in FIG. 6B. This embodiment includes a living hinge 50 along a first side or edge of the moveable section 36. The living hinge 50 is molded or formed as part of the housing 22 and extends between the moveable section 36 and the housing portion 34.

A second side or edge of the moveable section 36 opposite from the first side includes a feature 52 that engages part of the wall of the portion 34. In this example, the feature 52 includes a tab or detent that is received at least partially within a recess 54 on the wall of the portion 34 to maintain the moveable section 36 in the first position. The moveable section 36 in this example is selectively moveable into the second position as schematically shown in FIG. 6B using a tool like the tool 40 shown in FIG. 4, for example.

The embodiment shown in FIGS. 6A and 6B may also include a sheet of adhesive material over the pivotally moveable pieces and they may collectively be considered the moveable section 36.

Figure 7:
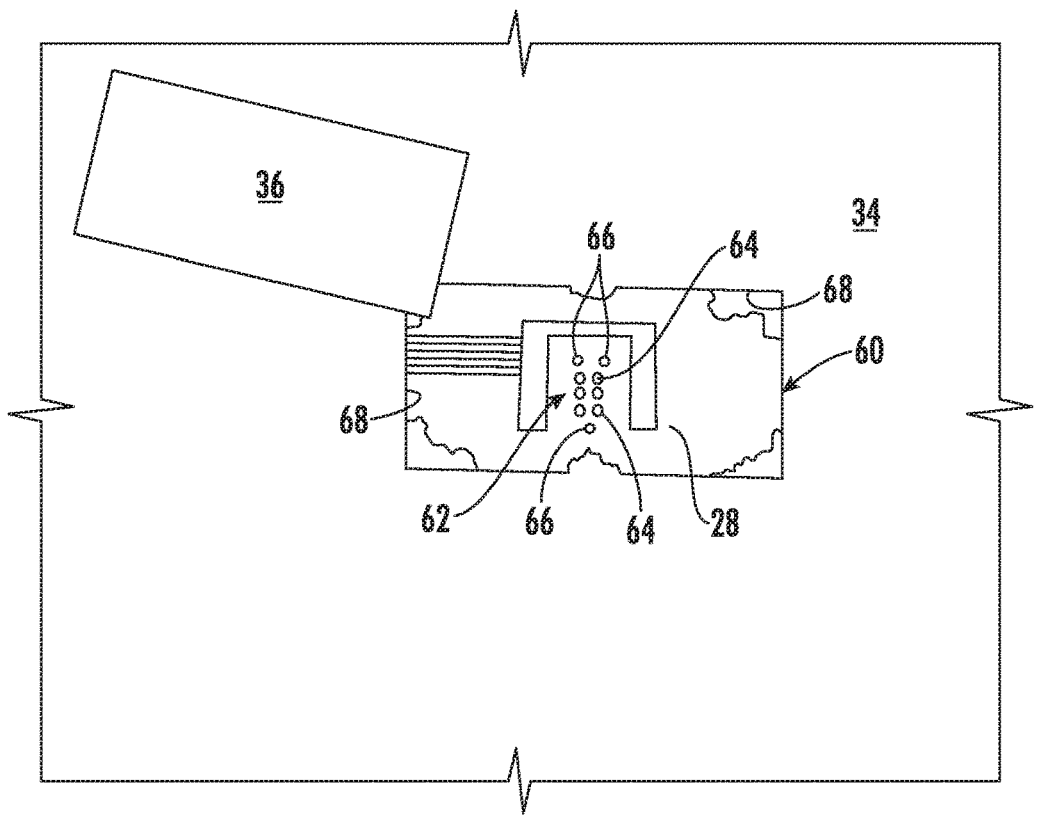
FIG. 7 diagrammatically shows an example communication port that is accessible when the moveable section is in the second position.

The example configurations of a moveable section 36 each allow access to an area inside the housing 22 through an opening 60 in the housing portion 34 as shown in FIG. 7. When the moveable section 36 is in the second position one side of the substrate 28 is at least partially exposed. A communication port 62 is accessible on the exposed side of the substrate. The communication port 62 facilitates access to at least one of the memory 32 and the controller 30. The communication port 62 in this example comprises a plurality of conductive pads 64 on the substrate 28.

The conductive pads 64 in the illustrated example are coupled to circuit traces on the substrate 28 that are connected to appropriate input or output terminals of the memory 32 or controller 30, for example. In some embodiments, the conductive pads 64 are test points that allow access to signaling or power lines on the substrate so those can be monitored.

The illustrated example includes a plurality of recesses 66 in the substrate 28 that are useful for positioning a communication device relative to the communication port 62 to facilitate an appropriate connection between the communication device and the communication port 62. In this example, the recesses 66 are holes through the substrate 28.

The illustrated example also includes an edge 68 of the housing portion 34 that is configured to cooperate with a corresponding feature on a communication device to position that device relative to the communication port 62 so an appropriate connection exists.

Figure 8:
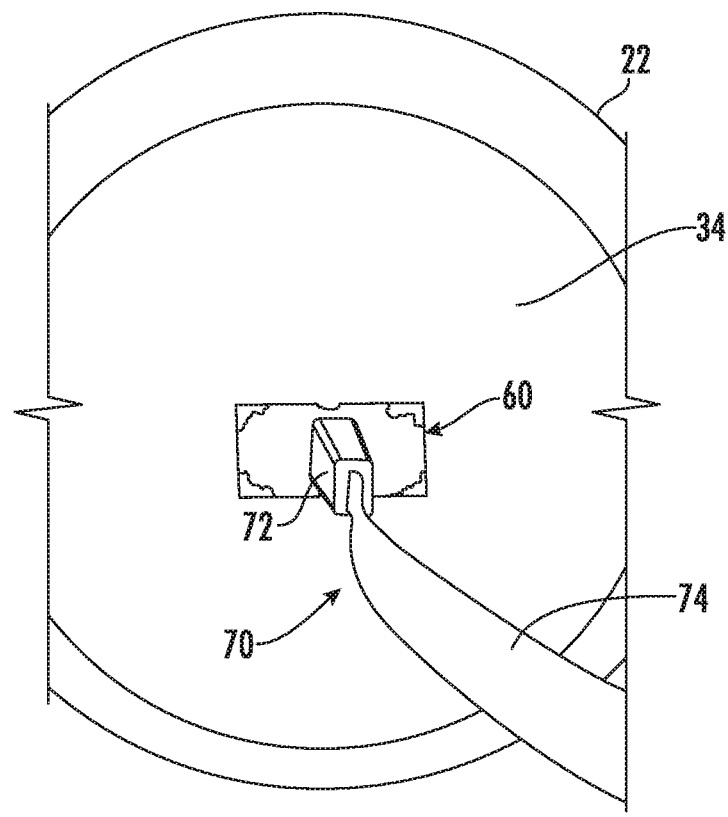
FIG. 8 diagrammatically shows an example communication device associated with the communication port.
Figure 9:
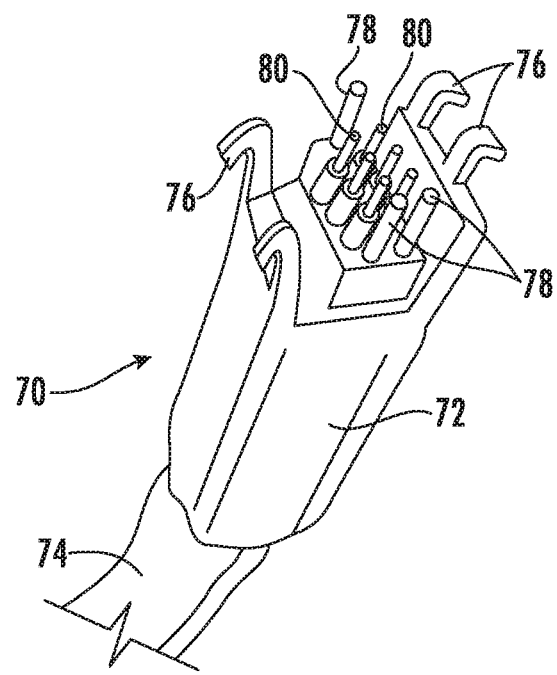
FIG. 9 diagrammatically shows selected features of an example communication device.

FIG. 8 shows an example communication device 70 in communication with the communication port 62. FIG. 9 shows a portion of the communication device 70 separate from the monitoring device 20. The communication device 70 include a connection housing 72 and at least one conductor 74. In this example, there are a plurality of distinct conductors 74. The connection housing 72 includes a plurality of detents 76 that are configured to engage the edge 68 around the opening 60 to hold the communication device in a position relative to the monitoring device 20 where a reliable connection is established and maintained between the communication device 70 and the communication port 62.

A plurality of posts 78 are included in the example embodiment. The posts 78 are configured to fit at least partially into the recesses or holes 66 in the substrate 28. The posts 78 and the detents 76 may both position the communication device 70 relative to the communication port 62. Some embodiments include posts 68 but no detents 76 while other embodiments include detents 76 but no posts 68.

The communication device 70 includes a plurality of conductive pins 80 that contact the conductive pads 64 of the communication port. The conductive pins 80 are coupled with respective ones of the conductors 74 to facilitate communications between a diagnostic tool or computer, for example, and the controller 30 and memory 32. The pins 80 in this example are resiliently biased away from the connector housing 70 and the end of the conductors 74. A spring or other biasing member urges the pins 80 in an outward direction to urge the ends of the pins 80 into contact with the conductive pads 64 of the communication port 62 when the connection housing 72 is properly situated relative to the housing portion 34. The posts 78, detents 76, or both facilitate maintaining a proper connection between the pins 80 and the conductive pads 64.

The example moveable sections 36 allow access to the communication port 62 to facilitate communication with the controller 30 and memory 32 to obtain information regarding operation of the detector portion 26 or another component of the monitoring device 20 without requiring disassembling the device 20 in a manner that would disturb the condition of the detector portion 26 or the component of interest. If the housing 22 were disassembled, for example, that can alter the condition of the components of the monitoring device 20 in a way that would interfere with accurate analysis of the component of interest.

The access to the communication port 62 provided by the example embodiments also facilitates programming or updating the controller 30 in a convenient manner Another feature of some embodiments is that the communication access does not introduce any additional material or manufacturing costs compared to monitoring devices without such communication port access.

The features of the illustrated example embodiments are not necessarily limited or exclusive to those specific embodiments. Other embodiments are possible that combine at least one feature of one of the example embodiments with at least one feature of another embodiment in a variety of combinations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A monitoring device, comprising:
a housing;
a detector portion situated in the housing;
a substrate situated in the housing; and
memory supported on the substrate, the memory being configured to contain information regarding operation of the detector portion, at least one of the substrate or the memory including a communication port situated adjacent a portion of the housing, the communication port facilitating obtaining information from the memory,
wherein the portion of the housing comprises at least one movable section that covers the communication port when the at least one moveable section is in a first position relative to the housing and exposes the communication port when the at least one moveable section is in a second position relative to the housing.

2. The monitoring device of claim 1, comprising a controller situated in the housing, the memory being associated with the controller, the communication port facilitating communication with the controller.

3. The monitoring device of claim 2, wherein communication with the controller comprises at least one of obtaining information from the controller and providing programming to the controller.

4. The monitoring device of claim 1, wherein the at least one moveable section is moveable from the first position toward the second position by breaking the at least one moveable section away from the portion of the housing.

5. The monitoring device of claim 4, wherein
the portion of the housing comprises a wall;
the wall includes a breakable segment;
the wall has a first thickness;
the breakable segment has a second thickness that is less than the first thickness; and
the breakable segment breaks as the at least one moveable section moves from the first position toward the second position.

6. The monitoring device of claim 1, wherein the at least one moveable section comprises an adhesive sheet.

7. The monitoring device of claim 1, wherein the at least one moveable section is pivotally moveable from the first position toward the second position.

8. The monitoring device of claim 7, wherein
the portion of the housing comprises a wall;
the portion of the housing includes a living hinge between the wall and the at least one moveable section along one side of the at least one moveable section; and
the wall releasably engages the at least one moveable section along an opposite side of the at least one moveable section.

9. The monitoring device of claim 1, wherein
the portion of the housing comprises a first material;
the at least one moveable section comprises a second material; and
the second material is different than the first material.

10. The monitoring device of claim 9, wherein
the first material comprises a rigid plastic; and
the second material comprises an adhesive sheet received against the rigid plastic.

11. The monitoring device of claim 1, wherein
the substrate comprises a printed circuit board;
the communication port comprises a plurality of conductors on the printed circuit board;
at least one portion of each of the conductors is exposed on one side of the printed circuit board; and
the one side of the printed circuit board faces toward the portion of the housing.

12. The monitoring device of claim 11, wherein at least one of the substrate and the housing is configured to receive a portion of a communication device for holding the communication device in a position to contact the communication port.

13. The monitoring device of claim 12, wherein the substrate includes a plurality of holes configured to receive corresponding protrusions on the communication device.

14. The monitoring device of claim 12, wherein
the portion of the housing includes an opening when the at least one moveable section is in the second position; and
an edge of the opening is configured to cooperate with a portion of the communication device to hold the communication device adjacent the communication port.

15. The monitoring device of claim 1, wherein the portion of the housing is on a side of the housing that is configured to be situated against a structure when the monitoring device is installed in a monitoring location.

16. The monitoring device of claim 1, wherein the detector portion is configured to detect smoke.

17. A communication device configured to communicate with the monitoring device of claim 1, the communication device comprising:
at least one conductor;
at least one pin near one end of the at least one conductor, the at least one pin being configured to contact the communication port; and
at least one positioning member near the at least one pin, the at least one positioning member interfacing with at least one of the housing and the substrate to position the at least one pin to contact the communication port.

18. The communication device of claim 17, comprising
a connector housing near the one end of the conductor; and
a biasing member supported by the connector housing, wherein the biasing member resiliently biases the at least one pin in a direction away from the one end of the conductor.

19. The communication device of claim 17, wherein the at least one positioning member comprises at least one post near the at least one pin, the at least one post being configured to be received in a recess in at least one of the substrate and the housing.

20. The communication device of claim 18, wherein
the at least one positioning member comprises a detent on the connector housing; and
the detent is configured to engage the portion of the housing when the at least one moveable section is in the second position.

\* \* \* \* \*